US008135556B2

(12) United States Patent
Fricke

(10) Patent No.: US 8,135,556 B2
(45) Date of Patent: Mar. 13, 2012

(54) METHODS AND SYSTEMS FOR OFF-LINE CONTROL FOR SIMULATION OF COUPLED HYBRID DYNAMIC SYSTEMS

(75) Inventor: David M. Fricke, Prior Lake, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 494 days.

(21) Appl. No.: 12/244,597

(22) Filed: Oct. 2, 2008

(65) Prior Publication Data
US 2010/0088058 A1 Apr. 8, 2010

(51) Int. Cl.
*G01M 17/00* (2006.01)
*G06F 11/00* (2006.01)
*G05B 13/04* (2006.01)

(52) U.S. Cl. ............... 702/113; 702/182; 700/30
(58) Field of Classification Search ............... 702/113
See application file for complete search history.

(56) References Cited

U.S. PATENT DOCUMENTS

| | | |
|---|---|---|
| 3,592,545 A | 7/1971 | Paine et al. |
| 3,597,967 A | 8/1971 | Drexler et al. |
| 3,818,751 A | 6/1974 | Karper et al. |
| 3,939,692 A | 2/1976 | Bolliger |
| 4,882,677 A | 11/1989 | Curran |
| 5,014,719 A | 5/1991 | Mc Leod |
| 5,038,605 A | 8/1991 | Tews |
| 5,101,660 A | 4/1992 | La Belle |
| 5,168,750 A | 12/1992 | Kurtz |
| 5,259,249 A | 11/1993 | Fetto |
| 5,277,584 A | 1/1994 | DeGroat |
| 5,369,974 A | 12/1994 | Tsymberov |
| 5,430,645 A | 7/1995 | Keller |
| 5,450,321 A | 9/1995 | Crane |
| 5,487,301 A | 1/1996 | Ueller |

(Continued)

FOREIGN PATENT DOCUMENTS

DE 2728007 8/1978

(Continued)

OTHER PUBLICATIONS

D.W. Clarke, Adaptive control of a materials-testing machine, 1996, The Institution of Electrical Engineers, pp. 4/1-4/4.

(Continued)

*Primary Examiner* — Sujoy Kundu
*Assistant Examiner* — Michael Dalbo
(74) *Attorney, Agent, or Firm* — Steven M. Koehler; Westman, Champlin & Kelly, P.A.

(57) ABSTRACT

Systems and methods are provided for controlling the simulation of a coupled hybrid dynamic system. A physical test rig configured to drive the physical structure component of the system and to generate a test rig response as a result of applying a test rig drive signal. A processor is configured with a virtual model of the system. The processor receives the test rig response and generates a model response of the system based on the received test rig response and a virtual drive input. The system is driven with a random input. The processor compares the test rig response with the model response, the difference being used to form a system dynamic response model for generating the test drive signal. An inverse of the system dynamic response model is used to iteratively reduce the difference between the model response and the test rig response below a defined threshold.

14 Claims, 7 Drawing Sheets

U.S. PATENT DOCUMENTS

| | | | |
|---|---|---|---|
| 5,511,431 A | 4/1996 | Hinton |
| 5,541,504 A | 7/1996 | Kubo |
| 5,598,076 A | 1/1997 | Neubauer |
| 5,602,759 A | 2/1997 | Harashima |
| 5,821,718 A | 10/1998 | Shaffer |
| 5,877,414 A | 3/1999 | Rui |
| 5,880,362 A | 3/1999 | Tang |
| 5,936,858 A | 8/1999 | Arai |
| 5,937,530 A | 8/1999 | Masson |
| 5,942,673 A | 8/1999 | Horiuchi |
| 5,952,582 A | 9/1999 | Akita |
| 5,959,215 A | 9/1999 | Ono |
| 5,999,168 A | 12/1999 | Rosenberg |
| 6,044,696 A | 4/2000 | Spencer-Smith |
| 6,105,422 A | 8/2000 | Pollock |
| 6,134,957 A | 10/2000 | Fricke |
| 6,141,620 A | 10/2000 | Zyburt |
| 6,171,812 B1 | 1/2001 | Smith |
| 6,192,745 B1 | 2/2001 | Tang |
| 6,234,011 B1 | 5/2001 | Yamagishi |
| 6,247,348 B1 * | 6/2001 | Yamakado et al. ......... 73/11.04 |
| 6,285,972 B1 | 9/2001 | Barber |
| 6,418,392 B1 | 7/2002 | Rust |
| 6,510,740 B1 | 1/2003 | Behm |
| 6,538,215 B2 | 3/2003 | Montagnino |
| 6,571,373 B1 | 5/2003 | Devins |
| 6,581,437 B2 | 6/2003 | Chrystall |
| 6,634,218 B1 | 10/2003 | Nakanishi |
| 6,715,336 B1 | 4/2004 | Xu |
| 6,721,922 B1 | 4/2004 | Walters |
| 6,725,168 B2 | 4/2004 | Shiraishi |
| 6,754,615 B1 | 6/2004 | Germann |
| 6,898,542 B2 | 5/2005 | Ott |
| 6,962,074 B2 | 11/2005 | Lenzen |
| 7,031,949 B2 * | 4/2006 | Lund ............................... 706/14 |
| 7,058,488 B2 | 6/2006 | Kemp |
| 7,104,122 B2 | 9/2006 | Kurai |
| 7,117,137 B1 | 10/2006 | Belcea |
| 7,146,859 B2 * | 12/2006 | Dittmann et al. ............... 73/669 |
| 6,502,837 B1 | 1/2007 | Hamilton |
| 7,194,888 B1 | 3/2007 | Temkin |
| 7,257,522 B2 | 8/2007 | Hagiwara |
| 7,363,805 B2 | 4/2008 | Jayakumar |
| 7,383,738 B2 | 6/2008 | Schulz |
| 7,441,465 B2 | 10/2008 | Oliver |
| 2001/0045941 A1 | 11/2001 | Rosenberg |
| 2002/0029610 A1 | 3/2002 | Chrystall |
| 2002/0134169 A1 | 9/2002 | Takeda |
| 2002/0170361 A1 | 11/2002 | Vilendrer |
| 2003/0029247 A1 | 2/2003 | Biedermann |
| 2003/0183023 A1 | 10/2003 | Kusters |
| 2004/0019382 A1 | 1/2004 | Amirouche |
| 2004/0019384 A1 | 1/2004 | Kirking |
| 2004/0107082 A1 | 6/2004 | Sato |
| 2004/0255661 A1 * | 12/2004 | Nagai et al. ..................... 73/146 |
| 2005/0120783 A1 | 6/2005 | Namoun |
| 2005/0120802 A1 | 6/2005 | Schulz |
| 2006/0005616 A1 | 1/2006 | Bochkor |
| 2006/0028005 A1 | 2/2006 | Dell Eva |
| 2006/0059993 A1 | 3/2006 | Temkin |
| 2006/0069962 A1 | 3/2006 | Dittmann |
| 2007/0256484 A1 | 11/2007 | Imanishi |
| 2007/0260372 A1 | 11/2007 | Langer |
| 2007/0260373 A1 | 11/2007 | Langer |
| 2007/0260438 A1 | 11/2007 | Langer |
| 2007/0275355 A1 | 11/2007 | Langer |
| 2008/0271542 A1 | 11/2008 | Schulz |
| 2008/0275681 A1 | 11/2008 | Langer |
| 2008/0275682 A1 | 11/2008 | Langer |
| 2009/0012763 A1 | 1/2009 | Langer |

FOREIGN PATENT DOCUMENTS

| | | |
|---|---|---|
| DE | 4411508 | 10/1995 |
| EP | 0890918 | 1/1999 |
| EP | 0919201 | 6/1999 |
| EP | 1422508 | 7/2002 |
| EP | 1396802 | 8/2003 |
| JP | 2000-289417 | 4/1999 |
| WO | WO 93/12475 | 6/1993 |
| WO | WO 0023934 | 4/2000 |
| WO | WO 2007133600 | 11/2007 |

OTHER PUBLICATIONS

The 858 Mini Bionix II Test System Brochure; mts.com/downloads/300213.01.pdf;pub.1999.

* cited by examiner

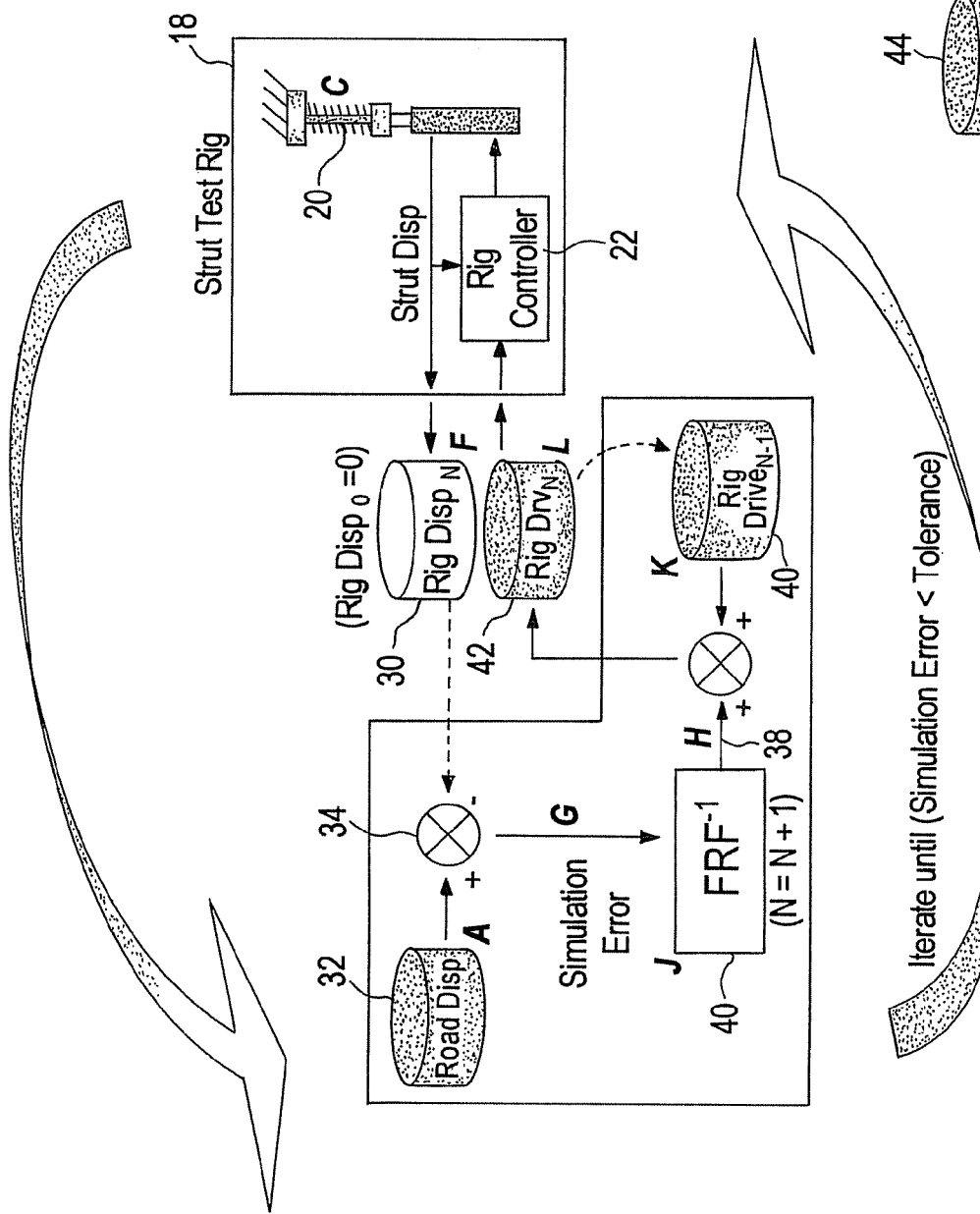
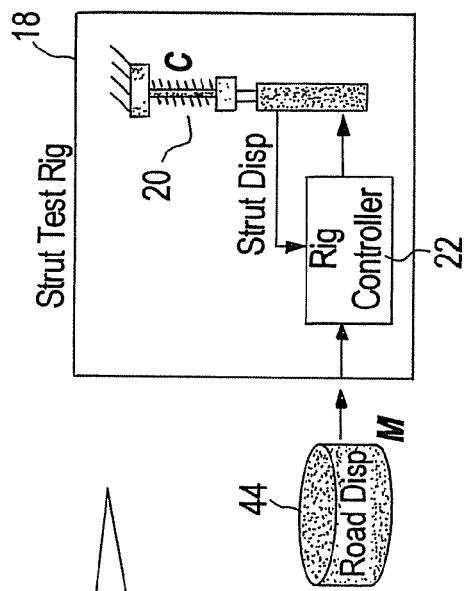
Fig. 3
Fig. 4

METHODS AND SYSTEMS FOR OFF-LINE CONTROL FOR SIMULATION OF COUPLED HYBRID DYNAMIC SYSTEMS

FIELD

The present disclosure relates to the field of simulation, and more in particular, to methods and systems for controlling the simulation of dynamic systems.

BACKGROUND

In the design and evaluation of complex dynamic systems, such as vehicles and vehicle components, it is desirable and often necessary to test and tune the components. This is to determine the effect of the vehicle component on vehicle performance, and the effect of the vehicle on the component. Durability testing may be performed as well as other types of tests that are desired. A number of different methodologies and systems have been employed in the testing of components in vehicles.

FIGS. 1-4 show a data collection system and method for a conventional laboratory simulation test. In such a method, a physical vehicle 10 is driven over a test road 12 and the specific component responses are measured. For example, the displacement of a suspension strut (not shown) installed in the physical vehicle 10 can be measured and stored in an appropriate database. These responses are provided as reference numeral 14. The responses of the specific component, such as the strut, are used as reference measurements for the test control process.

Referring now to FIG. 2, a generic (i.e., random amplitude, broadband frequency) drive 16, also referred to here as a random rig drive, is input into a test rig 18. The specific vehicle component, in this example a suspension strut 20, is installed in the test rig 18. A rig controller 22 converts the drive signal from the random rig drive 16 to control the movement of the test rig 18. A response of the test component, such as a displacement of the strut 20, is measured at the test rig 18. The measurements are provided at 24 to form the test component response. In the example of FIG. 2, the test component response 24 is a random rig displacement in response to the input and the rig 16. The inputting of the random rig drive 16 and the measurement of the random rig displacement 24 are real-time processes. The rig controller 22 need not be a complex tracking controller as it merely responds to the random drive 16. The rig controller 22 does not perform complex real-time modeling calculations to compensate for rig or specimen dynamics.

The test component response 24 is used with the test rig drive 16 to calculate a general system dynamic response model 26. The response model represents the coupled dynamics of the test system and component. In a multi-input-multi-output test it would also represent the cross-coupled dynamics between control inputs. The response model 26, typically a frequency response function (FRF), will be inverted, and used for test rig drive prediction in the simulation control process. In this example, the determination of the general system dynamic response model 26 is an off-line process, since the entire drive and response time histories are required to calculate a well-defined FRF.

Hence, in the conventional test system and process, the first step is to determine the input/output relationship that exists in the laboratory at the test rig 18. The relationship between the inputs to the control system for the test and how that system responds to those inputs needs to be understood. With this understanding, a compensated test drive signal can be developed to generate any desired component response.

Following the determination of how the components respond in a vehicle environment (see FIG. 1); and how the test environment influences the component response (see FIG. 2), an iterative test drive signal development process is then performed, as depicted in FIG. 3.

In an initial iteration (N=0), the test rig response is considered to be zero, and the desired response 32, which was already determined in FIG. 1, is used with an inverse ($FRF^{-1}$) 40 of the general system dynamic response model 26 determined in FIG. 2. to create an initial drive. In each iteration, a current test rig response 30 is compared to the desired response A comparator 34 provides the simulation error to generate a drive correction 38 using the inverse ($FRF^{-1}$). At this time, the iteration number is incremented.

The drive correction 38 is added to a previous test rig drive 40 to generate a next test rig drive 42. The determination of the next test rig drive in response to the previous test rig response is an off-line process.

The next test rig drive 42 is applied to the test rig 18 and the component response 30 is measured. The process of FIG. 3 is repeated iteratively until the resulting simulation error is reduced below a desired tolerance value. In performing test drive iteration, the test rig drive 42 is incrementally changed to obtain the response from the test rig 18 that had been previously measured. In other words, a test rig drive 42 is determined that will produce the same response from the physical vehicle component that was previously obtained during the data collection phase of FIG. 1.

Once the test rig drive 42 is determined through the iterative process until the simulation error is below a predetermined value, this now-final test rig drive 44 is used for subsequent testing of the component, as seen in FIG. 4. Different types of testing can be performed, such as a performance test, durability test, etc.

While the conventional iterative test method has certain benefits, it is a requirement for this method to secure a desirable vehicle, apply instrumentation and acquire test data before preparing the test. This makes the conventional simulation test system and method less useful in certain respects. It is possible that a suitable test vehicle to measure the component response cannot be obtained prior to the need to test the vehicle component. For example, it may be desired to determine the response of a vehicle component of a vehicle that does not yet exist, such as a new model car that is not yet in production or even prototyped. Further, there is often insufficient time or resources to properly prepare a vehicle to measure data for a physical component test. Further, a large number of component variations may need to be tested, and each variation would affect the component response in the vehicle. Also, a component's response within the vehicle system often changes gradually over time, such as in a durability test, and testing must be adapted for the test to remain valid.

FIG. 5, depicts another system and methodology for testing a physical component, and is known as real-time mHIL (model hardware in loop). As opposed to the test method depicted in FIGS. 1-4, a physical vehicle is not driven over the road with the installed key component. Instead, a virtual vehicle is used, without the key component installed, and is driven over a virtual road. This vehicle is modeled by a processor (not shown). The vehicle model, represented as reference numeral 50, excludes the physical test component. The vehicle model generates a response 52 from being driven over the virtual test road. This response 52 is applied through a reflected-memory processor link 54 as a control input 56 to a physical test system, such as a test rig 58.

The test rig 58 includes a complex rig controller 60 in which a model is provided. Whatever happens inside the virtual vehicle needs to happen to the physical component 62 within the test rig 58. Hence, the test rig 58 includes the physical test component that was not provided in the vehicle model 50.

The response of the physical component 62 in the test rig 58 is provided as an additional input 64 to the model of the vehicle 50. This response is provided to the model 50 in real time via the reflected-memory link 54.

The real-time mHIL process depicted in FIG. 5 is a closed-loop process that allows the physical component test response to be evaluated immediately, and automatically adapt to changes in the test environment. Limitations of the application of this system are the fidelity of the real-time vehicle model, the speed of the reflected-memory link and processors, and the tracking performance of the test rig controller 60. In order for such a system to work, the model has to operate in real-time. To accomplish this with today's technology, the vehicle model and the modeling in the rig controller may have to be simplified. Also, real-time capable models may lack fidelity at higher frequencies, but an engineer evaluating durability may require simulation of these frequencies to achieve an accurate test. Hence, the real-time mHIL process and arrangement of FIG. 5 have constraints that can limit the usefulness of such a system.

SUMMARY

There is a need for providing systems and methods that avoid the need for acquiring data from a physical vehicle or other system, and which also provide a feedback link to a vehicle model from a test rig. In general, hybrid-simulation offers the potential for generic test capability. This means that accurate simulation and testing of isolated physical sub-systems is possible without requiring specific, unique system input or response to be known. In the optimal implementation, where the virtual component dynamics are coupled to the physical system forces and motions, the hybrid system is able to respond accurately to any change which occurs in the system input, or to changes in the physical or virtual component behavior.

The earlier stated needs are met by systems and methods according to the present disclosure that provide an arrangement for controlling simulation of a coupled hybrid dynamic system. The arrangement comprises a physical test rig configured to drive a physical structural component of the system and to generate a test rig response as a result of applying a drive signal input to the test rig. A processor is configured with a virtual model of the complementary system to the physical component. The processor receives a test rig response as an input and generates a model response of the system using a first part of the received test rig response and a virtual drive as inputs. The processor is further configured to compare a different, second part of the test rig response with the corresponding model response to form a difference, the difference being used to form a system dynamic response model for generating the test rig drive signal.

In certain embodiments, the processor is further configured to generate the test drive signal, receive the test rig response, generate a model response, and compare the test rig response with the model response to generate a hybrid simulation process error. The error is then reduced using an inverse of the system dynamic response model, in an iterative fashion until the difference between the model response and the test rig response is below a defined threshold.

The foregoing features, aspects and advantages of the disclosed embodiments will become more apparent from the following detailed description and accompanying drawings.

BRIEF DESCRIPTION OF THE DRAWINGS

FIG. 3 is a schematic and block diagram of the response-simulation test system performing an iterative simulation error reduction process in accordance with the prior art.

FIG. 4 is a schematic block diagram of the system for performing a simulation laboratory test in accordance with the prior art.

DETAILED DESCRIPTION OF INVENTION

The embodiments of the present disclosure address and solve problems related to the control of a dynamic system, such as the concerns regarding the need to acquire data in other systems, the need to do real-time modeling and the constraints such real-time modeling imposes. The embodiments of the present disclosure address and solve these concerns, in part, by providing an arrangement for controlling the simulation of a coupled hybrid dynamic system. The arrangement comprises a physical test rig configured to drive a physical structural component of the system and to generate a test rig response as a result of applying a drive signal input to the test rig. The processor is configured with a virtual model of the system. The processor receives the test rig response and generates a model response of the system based on using a first part of the received test rig response and a virtual drive as inputs. The processor is further configured to compare a different, second part of the test rig response with the corresponding model response, the difference being used by the processor to form a system dynamic response model for generating the test rig drive signal. This is the system response modeling step. In a test drive development step, as provided in certain embodiments, the inverse of the system dynamic response model is used to iteratively reduce the difference between the model response and the test rig response below a defined threshold. One of the advantages of this approach is that the complete physical system is not needed, but rather an off-line, non-real-time model may be employed of the non-tested system components. Further, the method avoids the need to model the physical component, which is often being tested because, in fact, accurate models of the component are not available. Hence, limitations based on computing power, computing speed, and the availability of an accurate model of the tested component are avoided.

Figure 6:
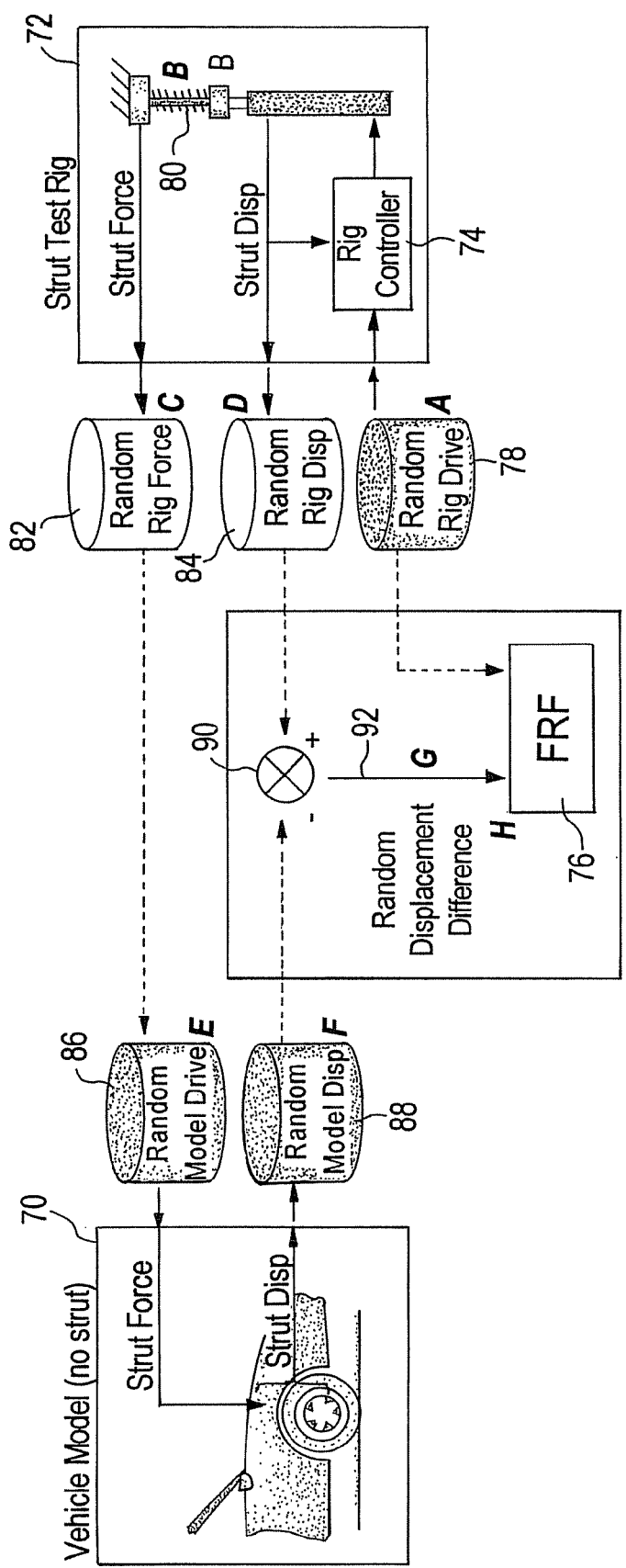
FIG. 6 depicts a system for performing off-line mHIL system dynamic response measurement in accordance with the presently disclosed embodiments.

FIG. 6 depicts an arrangement for controlling the simulation for a coupled hybrid dynamic system in accordance with the disclosed embodiments. In the arrangement, a vehicle model 70 is provided on a processor (seen in FIG. 9). The model of a vehicle is exemplary only, however, as other systems may be modeled without departing from the present disclosure. Also, for purposes of explanation, the physical component is a strut employed in a vehicle suspension system. Other components may be tested, as the strut is an example only of a physical component. A test rig 72 is also provided. In this example, the test rig 72 is configured to test a physical strut mounted within a test rig 72. However, the test rig 73 may be configured to test other structural components.

Figure 2:
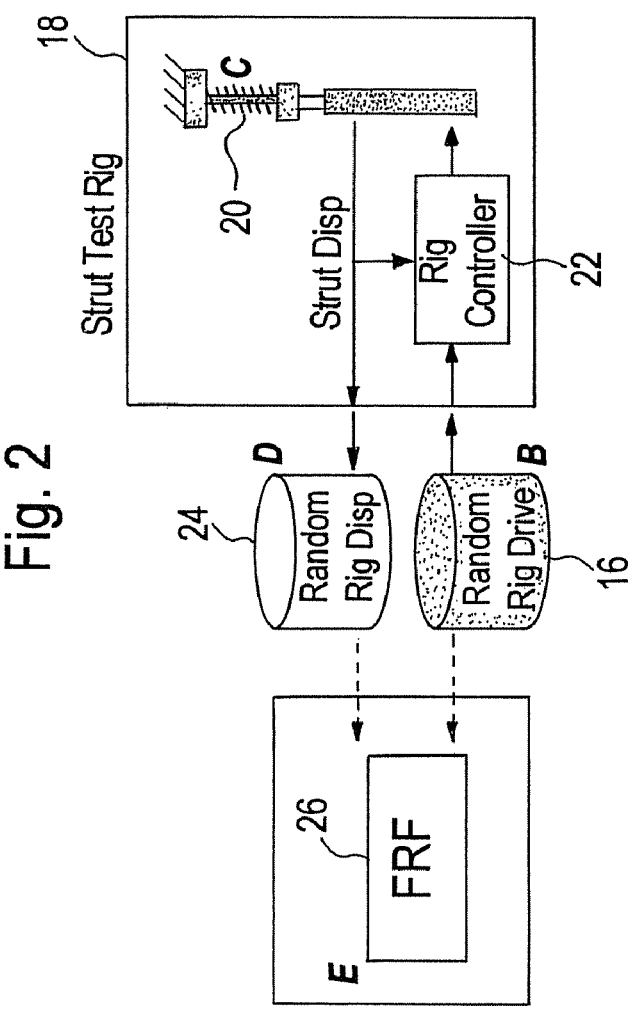
FIG. 2 is a schematic and block diagram of measurement of a response model for a response-simulation test arrangement in accordance with the prior art.
Figure 1:
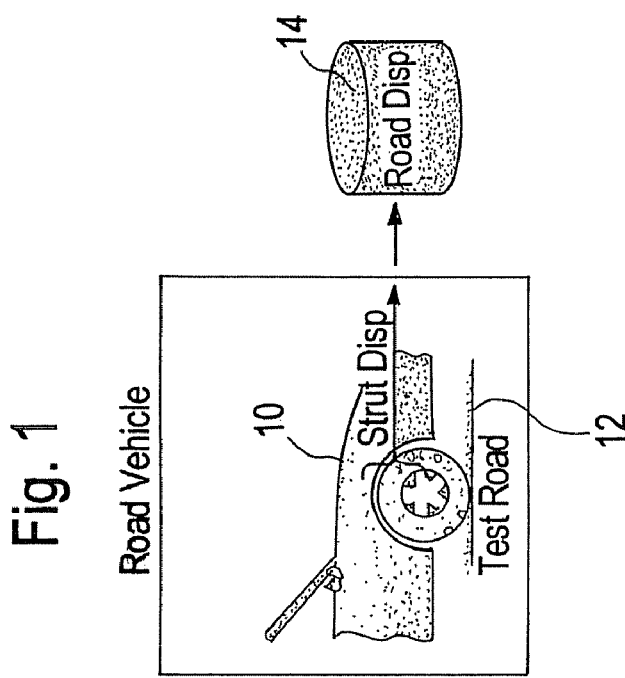
FIG. 1 is a schematic and block diagram of a data collection process in accordance with the prior art.
Figure 5:
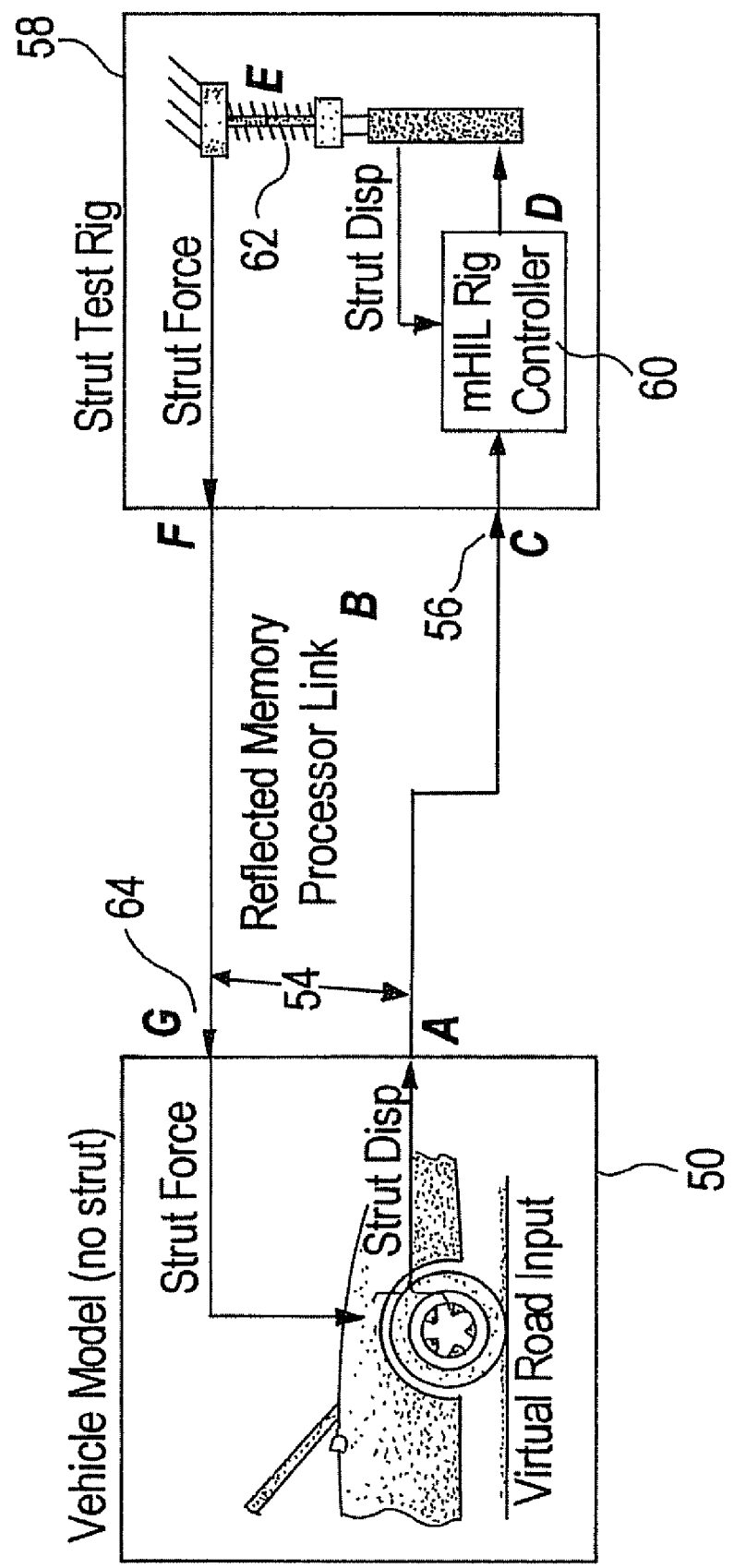
FIG. 5 is a schematic block diagram of a real-time model hardware in loop (mHIL) system in accordance with the prior art.

The test rig 72 has a rig controller 74. Unlike the rig controller 60 of the real-time mHIL system of FIG. 4, the rig controller 74 in the embodiment of FIG. 5 does not need to have a complex system model that provides an instantaneous response to a model command. Because of its lack of complexity, a less expensive rig controller may be employed. Furthermore, testing in higher frequencies may be realized.

The arrangement forms a system dynamic response model that is employed to generate a drive signal used to drive the test rig 72. The system dynamic response model 76 may be a frequency response function (FRF), as one example. The system dynamic response model 76 may also be determined, or calculated, by the same processor on which the system model 70 is run. (See FIG. 9, for example). However, a system dynamic response model 76 may also be determined and calculated on a separate processor, not shown in the Figures.

FIG. 6 depicts the arrangement and steps to form the system dynamic response model 76. This can be termed the system response modeling step. This system dynamic response model will be employed in the iterative process of FIG. 7, described later. In FIG. 6, a random test rig drive 78 is played into the test rig 72 that has a vehicle component 80 (such as a strut) installed. The random test rig drive 78 may be a generic drive, such as a random amplitude, broadband frequency drive. Two responses are measured in the disclosed embodiment although the arrangement is not limited to two responses. One of these responses, such as a random test rig force signal 82, is to be applied to the vehicle model 70. The other response, such as a random rig displacement 84, is a response to be compared to the model response. In the disclosed embodiment of FIG. 6, the first response is the force exerted by the strut on the test rig 72, while the second response 84 is the displacement of the strut 80, which can also be provided as an input to the rig controller 74. It is to be noted that the force and displacement signals are exemplary only, as other response signals may be provided from the test rig 72.

The response from the test rig, such as the random rig force 82, is supplied as an input to form a random model drive 86 to the vehicle model 70. The vehicle model 70 excludes the component under test, in this case the strut 80. The vehicle model 70 responds to the random model drive input signal 86 with a random model response signal 88, in this case a displacement.

Figure 7:
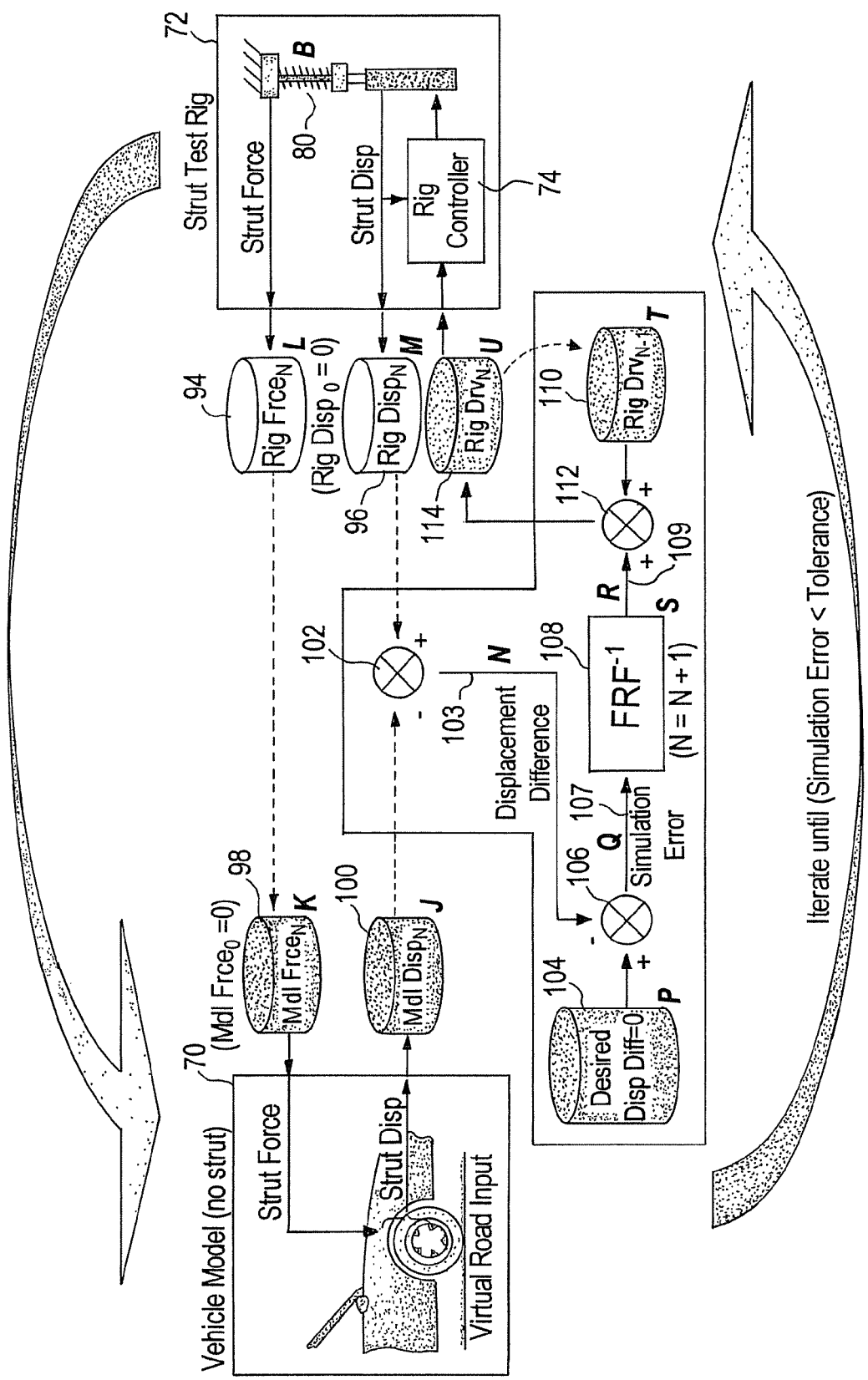
FIG. 7 is a schematic block diagram of an iteration process employing the off-line mHIL system of FIG. 6 in accordance with disclosed embodiments.

In the third step of the process, the model response 88 is compared to the associated test rig response 84. A comparison 90 is performed to form a response difference 92. The relationship between the response difference and the random rig drive establishes the system dynamic response model. This combined response model 76 will be inverted and used for test rig drive prediction in the iterative simulation control process of FIG. 7. The determination of the combined system dynamic response model 76 may be done in an offline process, such that high powered and high speed computing capabilities are not required. Further, with the offline mHIL system dynamic response model measurement of FIG. 6, the actual system, such as a physical vehicle, is not needed. This overcomes many of the disadvantages inherent with employing a physical system. Since there is no need to acquire data, any component can be tested without previous knowledge of how that component is going to respond within a virtual model, or in a physical environment. The offline mHIL measurement of the system dynamic response model measures the sensitivity of the difference in model and rig response to the rig inputs when the component is in the physical system. Once the relationship between rig drive and system response difference 92 is has been modeled, an offline mHIL iteration process is performed, as seen in FIG. 7. This may be considered as the test drive development step.

In the iterative process of FIG. 7, which is an offline iteration, the virtual system, excluding the test component, is operated. In the exemplary embodiment, the virtual system is a virtual vehicle and the test component that is excluded is the strut 80. The virtual vehicle is driven over a test road, to generate a model response 100. As an example, a model response 100 may represent a displacement of the strut 80, although since the strut 80 is not actually present, it is really the displacement of the space that would be occupied by the strut 80 that is measured by the model response 100. An additional model input, in addition to the virtual test road input, is shown as reference numeral 98. The additional model input 98 to the vehicle model 70 is based on the test rig response 94 from the test rig 72. The additional model input 98, such as the force measured at the test rig 72 is applied simultaneously to the vehicle model 70 during a testing. For an initial iteration (N=0), the model input 98 will typically be at zero.

The model response 100 is compared to the test rig response 96 from the test rig 72. This test rig response 96 must also be a displacement, if the model response 100 is a displacement. A comparison of 102 is made between the test rig response 96 and the model response 100 to form a response difference 103.

A response difference 103, in this case a displacement difference, is compared to a desired difference 104. Typically, the desired difference 104 will be set at zero for an iterative control process. In further embodiments, however, other desired differences may be employed without departing from the scope of the present disclosure.

The comparison 106 between the response difference 103 and the desired difference 104 produces a simulation error 107 used by the inverse ($FRF^{-1}$) of the system dynamic response model 76 that was previously determined in the steps shown in FIG. 6. The inverse of the system dynamic response model 76 is depicted as reference numeral 108 in FIG. 7. A drive correction 109 is added to the previous test rig drive signal 110 at 112 to generate the next test rig drive signal 114.

The next test rig drive signal 114 is applied to the test rig 72 and first and second responses are measured. The response to be applied to the vehicle model, response 94, is the response to be compared to the model response, response 96. The process is repeated iteratively until the resulting simulation error 107 is reduced to a desired tolerance value.

The modeling of the vehicle 70 and the determination of the final test rig drive signal is capable of being performed within a single processor. However, in certain embodiments, multiple processors may be employed. Also, it should be understood that the process for determining the simulation error and the determination of the test rig drive signal 114 may be performed offline, providing the advantages discussed earlier.

Figure 8:
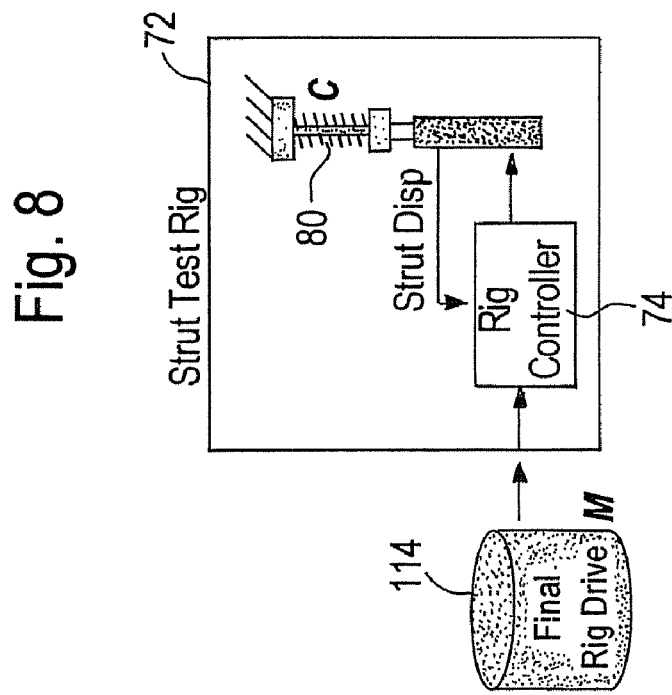
FIG. 8 is a schematic block diagram of an off-line mHIL test in accordance with the presently disclosed embodiments.

Following the determination of the test rig drive signal 114, the final test rig drive signal 114 is used in testing of the test component 80, as seen in FIG. 8. The test rig drive signal 114 is an input to the test rig controller 74 that drives the rig 72. Hence, performance testing, durability testing and other types of testing may be performed on the physical component 80, such as a strut, without the need for a physical vehicle to have been previously measured and tested, or in fact, to even exist. Neither is a complicated model of the component needed, as the physical component is part of the hybrid system. The offline measurements allow the model of the system to be used, avoiding the need for a physical vehicle or other system, but without requiring the performance of a real-time modeling system.

Figure 9:
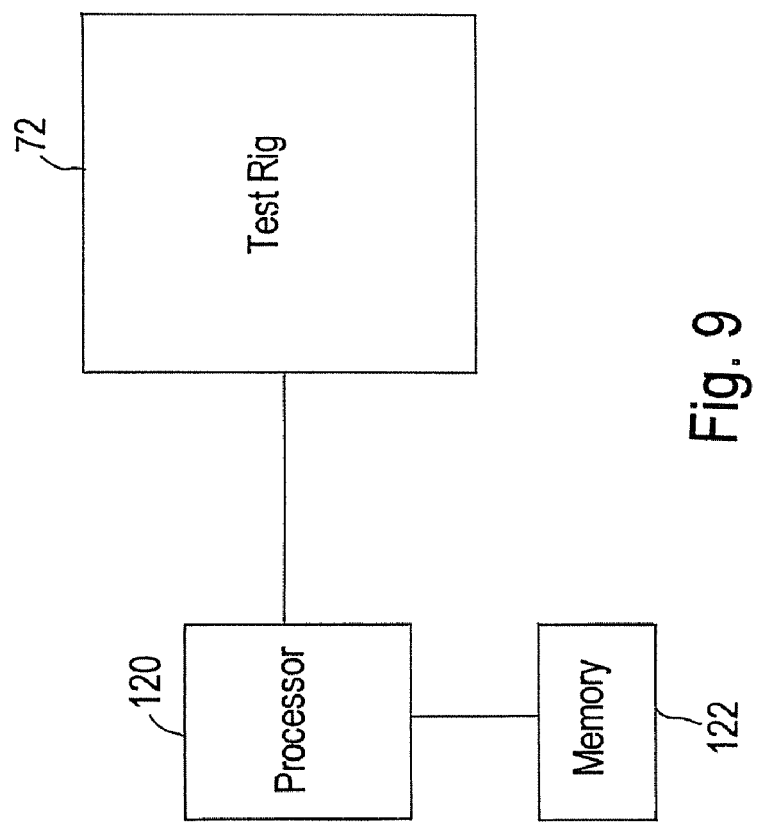
FIG. 9 depicts a block diagram of a system for performing the off-line mHIL processes depicted in FIGS. 6-8, in accordance with the presently disclosed embodiments.

FIG. 9, shows a block diagram of a processor 120 coupled to a test rig 72. The processor 120 may also be coupled to a database 122 and any other conventional components associated with processing, such as an interface, monitor, etc. Note that although shown as a connection between the processor 120 and the test rig 72, the connection is not a reflected memory processor link 54 shown in FIG. 3 of the real-time mHIL system. The coupling between the processor 120 and the test rig 72 is merely to provide signals to the test rig 72 as already depicted in FIGS. 6-8.

Figure 10:
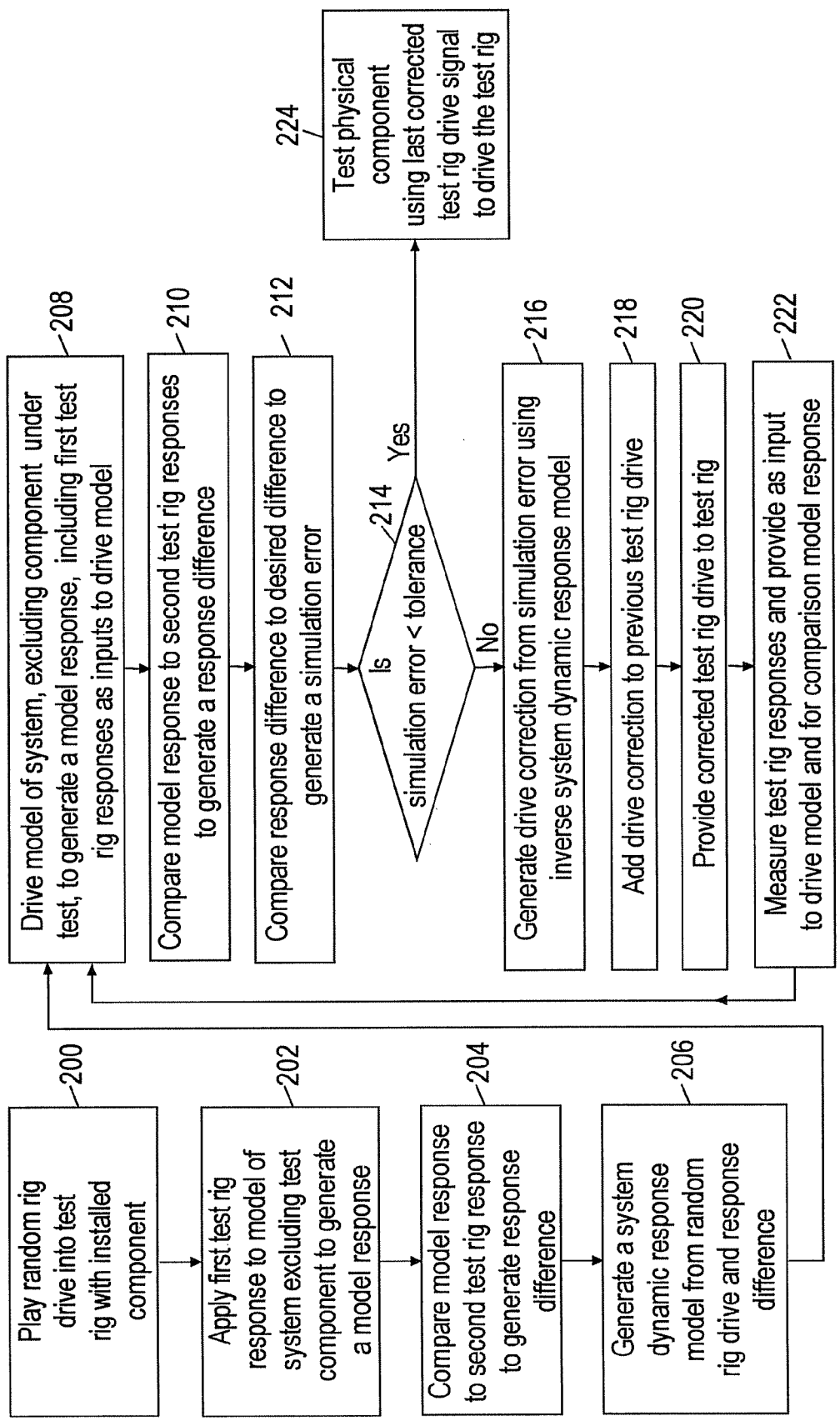
FIG. 10 is a flow chart of certain steps within a method for performing off-line mHIL iteration and testing in accordance with the presently disclosed embodiments.

FIG. 10 shows a simplified method for performing offline mHIL control of the simulation of coupled hybrid dynamic systems in accordance with the disclosed embodiments. The methodology depicted in FIG. 10 encompasses the steps described with respect to FIGS. 6-8.

In step 200, a random rig drive 78 is played into the test rig 72 with the installed component 80. In step 202, the first test rig response is applied to the model of the system excluding the test component, to generate a model response. The model response is compared to the second test rig response to generate a response difference in step 204. In step 206, a system dynamic response model is generated from the random rig drive and the response difference. Steps 200-206 represent the steps that are described with respect to FIG. 6, such that these steps perform an off-line mHIL measurement of the system dynamic response model, such as a frequency response function.

Steps 208-222, described below, represent the steps performed in the off-line mHIL iteration process of FIG. 7. In step 208, the model of the system is driven, excluding the component under test, to generate a model response. The driving of the system model includes test rig responses as inputs to the system model. In step 210, the model response is compared to an alternate test rig response to generate a response difference. The response difference is compared to a desired difference in step 212 to generate a simulation error. In step 214, it is decided whether the simulation error is less than a tolerance value. Assuming the answer is no, then a drive correction is generated from the simulation error using an inverse system dynamic response model, in step 216. The drive correction is added to the previous test rig drive, in step 218. The corrected test rig drive is provided to the test rig in step 220, and the test rig responses to the test rig drive are measured and provided as an input to the drive model and for comparison to the model response in step 222. The process returns back to step 208 and repeats until the simulation error is less than the tolerance, as determined in step 214.

Step 224 represents the process of testing the physical component depicted in FIG. 8. The physical component 80 is tested using the last corrected test rig drive signal 114 to drive the test rig 72.

The embodiments of the present disclosure are not limited to any specific combination of hardware circuitry and software. According to certain aspects of the present disclosure, processing may be implemented using the processor 120 of FIG. 9 executing one or more sequences of one or more instructions contained in database or memory 122. Such instructions may be read into database or memory 122 from another machine-readable medium, such as a disk containing instructions and read by a disk drive (not shown), for example. Execution of the sequences of instructions contained in the database or memory 122 causes processor 120 to perform the process steps described above. One or more processors in a multi-processing arrangement may also be employed to execute the sequences of instructions contained in database or memory 122. In alternative embodiments, hard-wired circuitry may be used in place of or in combination with software instructions to implement various embodiments of the present disclosure.

The term "machine-readable medium" as used herein refers to any medium that participates in providing instructions to processor 120 for execution. Such a medium may take many forms, including, but not limited to, non-volatile media, volatile media, and transmission media. Non-volatile media include, for example, optical or magnetic disks. Volatile media include dynamic memory. Transmission media include coaxial cables, copper wire, and fiber optics. Transmission media can also that the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Although embodiments of the present disclosure have been described and illustrated in detail, the same is by way of illustration and example only and is not to be taken by way of limitation, the scope of the invention being limited only by the terms of the appended claims.

What is claimed is:

1. An arrangement for controlling simulation of a coupled hybrid dynamic system, comprising:
   a physical test rig configured to drive a physical structural component of the system and to generate a test rig response comprising a first component and a second component as a result of applying a drive signal input to the test rig; and
   a processor configured with a virtual model of the system, the processor receiving the first component of the test rig response and generating a model response of the system based on using the first component of the received test rig response and a virtual drive as inputs;
   the processor further configured to compare the second component of the test rig response with the model response corresponding to the second component to form a difference, the difference being used by the processor to form a system dynamic response model for generating the test rig drive signal.

2. The arrangement of claim 1, wherein the processor is further configured to: generate the test rig drive signal, receive the test rig response, compare the second component of the test rig response with the model response to generate a simulation process error, and reduce the error using an inverse of the system dynamic response model, iteratively until a difference between the model response and the second component of the test rig response is below a defined threshold.

3. The arrangement of claim 2, wherein the physical test rig drives the physical structural component and generates a test rig drive signal in real-time, and the processor compares the second component of the test rig response with the model response to generate the simulation process error off-line.

4. The arrangement of claim 3, wherein the first component is a measured force signal that forms an input signal to the model of the system.

5. The arrangement of claim 4, wherein the second component is a measured displacement signal and the model response is a displacement signal of the system.

6. The arrangement of claim 5, wherein the processor is further configured to generate a drive correction signal using the inverse of the system dynamic response model.

7. The arrangement of claim 6, wherein the processor is further configured to combine the drive correction signal with the test rig drive signal to form an updated test rig signal to be input to the test rig as the test drive signal.

8. The arrangement of claim 7, wherein the system is a vehicle.

9. The arrangement of claim 1, wherein the first component is a measured displacement signal that forms an input signal to the model of the system.

10. The arrangement of claim 9, wherein the second component is a measured force signal and the model response is a force signal of the system.

11. A method of controlling simulation of a coupled hybrid dynamic system, comprising the steps of: driving a physical structural component of the system on a test rig by applying a drive signal input to the test rig to generate a test rig response as a result, and receiving the test rig response at a processor configured with a virtual model of the system and generating a model response of the system based on using a first part of the received test rig response as an input; comparing a different, second part of the test rig response with the model response corresponding to the second part of the test rig response to form a difference; and using the difference to form a system dynamic response model for generating the test rig drive signal.

12. The method of claim 11, further comprising: applying a virtual drive, generating the test rig drive signal, receiving the test rig response, generating a model response, comparing the test rig response with the model response to generate a simulation process error, and reducing the error using an inverse of the system dynamic response model, iteratively until a difference between the model response and the test rig response is below a defined threshold.

13. A non-transient machine readable medium encoded with instructions for causing a processor to control simulation of a coupled hybrid dynamic system, the instruction comprising code for: driving a physical structural component of the system on a test rig by applying a drive signal input to the test rig to generate a test rig response as a result, and receiving the test rig response at the processor configured with a virtual model of the system and generating a model response of the system based on using a first part of the received test rig response as an input; comparing a different, second part of the test rig response with the model response corresponding to the second part of the test rig response to form a difference; and using the difference to form a system dynamic response model for generating the test rig drive signal.

14. The non-transient machine-readable medium of claim 13, wherein the code further provides for causing the processor to control applying a virtual drive, generating the test rig drive signal, receiving the test rig response, generating a model response, comparing the test rig response with the model response to generate a simulation process error, and reducing the error using an inverse of the system dynamic response model, iteratively until a difference between the model response and the test rig response is below a defined threshold.

* * * * *